(12) United States Patent
Weiler et al.

(10) Patent No.: US 11,413,717 B2
(45) Date of Patent: Aug. 16, 2022

(54) METHOD FOR DETECTING A SUBSTANCE

(71) Applicants: Felder KG, Hall in Tirol (AT); Technische Universitaet Wien, Vienna (AT)

(72) Inventors: Thomas Weiler, Vienna (AT); Helmut Caudr, Vienna (AT); Friedrich Bleicher, Vienna (AT)

(73) Assignees: FELDER KG, Hall in Tirol (AT); TECHNISCHE UNIVERSITAET WIEN, Vienna (AT)

( * ) Notice: Subject to any disclaimer, the term of this patent is extended or adjusted under 35 U.S.C. 154(b) by 420 days.

(21) Appl. No.: 16/148,533

(22) Filed: Oct. 1, 2018

(65) Prior Publication Data

US 2019/0030670 A1 Jan. 31, 2019

Related U.S. Application Data

(63) Continuation of application No. PCT/AT2017/060019, filed on Feb. 3, 2017.

(30) Foreign Application Priority Data

Apr. 28, 2016 (EP) ..................................... 16167511

(51) Int. Cl.
*B23Q 11/00* (2006.01)
*F16P 3/14* (2006.01)
(Continued)

(52) U.S. Cl.
CPC ...... *B23Q 11/0078* (2013.01); *B23Q 11/0082* (2013.01); *B27B 5/38* (2013.01);
(Continued)

(58) Field of Classification Search
CPC ....................... B23Q 11/0078; B23Q 11/0082; B27G 19/02; B27G 19/00; F16P 3/148; G01V 3/08; B27B 5/38
See application file for complete search history.

(56) References Cited

U.S. PATENT DOCUMENTS 3,785,230 A    1/1974  Lokey
4,326,804 A *  4/1982  Mossey .................. G01B 11/14
                                                    250/224

(Continued)

FOREIGN PATENT DOCUMENTS

DE    197 16 035    10/1998
EP    1 234 285     6/2016
(Continued)

OTHER PUBLICATIONS

International Search Report dated Mar. 14, 2017 in International (PCT) Application No. PCT/AT2017/060019.
(Continued)

*Primary Examiner* — Jeff W Natalini
(74) *Attorney, Agent, or Firm* — Wenderoth, Lind & Ponack, L.L.P.

(57) ABSTRACT

A method is provided for detecting a substance, preferably human tissue, in the vicinity of a mobile tool, wherein the substance to be detected has different electrical characteristics from a material that can be processed by the mobile tool. In the method, a change is detected in a capacitance formed by the tool and a counter electrode that is electrically insulated from the tool. A periodic change in the capacitance is detected and the change is produced by the presence of the substance in a region in relation to the tool and by a periodic change in a geometrical characteristic of the tool in this region as the tool moves.

23 Claims, 8 Drawing Sheets

(51) Int. Cl.
*B27G 19/02* (2006.01)
*B27G 19/00* (2006.01)
*B27B 5/38* (2006.01)
*G01V 3/08* (2006.01)

(52) U.S. Cl.
CPC .............. *B27G 19/00* (2013.01); *B27G 19/02* (2013.01); *F16P 3/148* (2013.01); *G01V 3/08* (2013.01)

(56) References Cited

U.S. PATENT DOCUMENTS

| | | | | |
|---|---|---|---|---|
| 5,081,406 | A * | 1/1992 | Hughes | B23D 59/005 318/478 |
| 7,173,537 | B2 | 2/2007 | Voigtlaender | |
| 7,640,835 | B2 * | 1/2010 | Gass | B27G 19/02 83/13 |
| 7,739,934 | B2 | 6/2010 | Tetelbaum et al. | |
| 7,888,826 | B1 | 2/2011 | Shafer et al. | |
| 8,186,253 | B2 | 5/2012 | Tetelbaum et al. | |
| 8,336,432 | B1 | 12/2012 | Butler | |
| 9,495,011 | B1 * | 11/2016 | Lee | G06F 3/03547 |
| 2002/0017176 | A1 * | 2/2002 | Gass | B23D 59/001 83/13 |
| 2004/0017194 | A1 | 1/2004 | Saalwachter et al. | |
| 2004/0017294 | A1 * | 1/2004 | Metzger, Jr. | B27G 19/02 340/562 |
| 2005/0145080 | A1 | 7/2005 | Voigtlaender | |
| 2008/0041204 | A1 | 2/2008 | Gass | |
| 2010/0059144 | A1 * | 3/2010 | Tetelbaum | B23Q 11/0092 83/62 |
| 2010/0206145 | A1 | 8/2010 | Tetelbaum et al. | |
| 2011/0308365 | A1 | 12/2011 | Chiu et al. | |
| 2014/0001888 | A1 | 1/2014 | Frangen | |
| 2014/0083269 | A1 | 3/2014 | Carrier et al. | |
| 2014/0231113 | A1 * | 8/2014 | Steurer | B25F 5/00 173/1 |
| 2016/0263768 | A1 * | 9/2016 | DeCicco | F16P 3/148 |

FOREIGN PATENT DOCUMENTS

| | | |
|---|---|---|
| TR | 2014/02423 | 2/2014 |
| WO | 2004/061361 | 7/2004 |
| WO | 2010/027598 | 3/2010 |
| WO | 2015/130248 | 9/2015 |

OTHER PUBLICATIONS

Search Report dated Nov. 1, 2016 in European Application No. 16 167511 with English translation.
Notice of Opposition filed Apr. 27, 2022 in corresponding European Patent Application No. 3 239 588, 12 pages.
Notice of Opposition filed May 10, 2022 in corresponding European Patent Application No. 3 239 588, 34 pages, with machine English Translation.
Measuring capacitance & ESR, Meetteclmiek.info, Jan. 2014, https://meetechniek.info/passive/capacitance.html, 7 pages.
Wikipedia article "Kreissage", Apr. 13, 2016, 12 pages, cited in CB.
"Different Methods for the Determination of Capacitance," an experiment in the context of the project practical course WS 05/06, Friedrichs-Alexander University Erlangen Nürnberg, Jan. 23, 2006-Feb. 19, 2006 "Verschiedene Methoden zur Kapazitätsbestimmung," 40 pages, cited in CB.

* cited by examiner

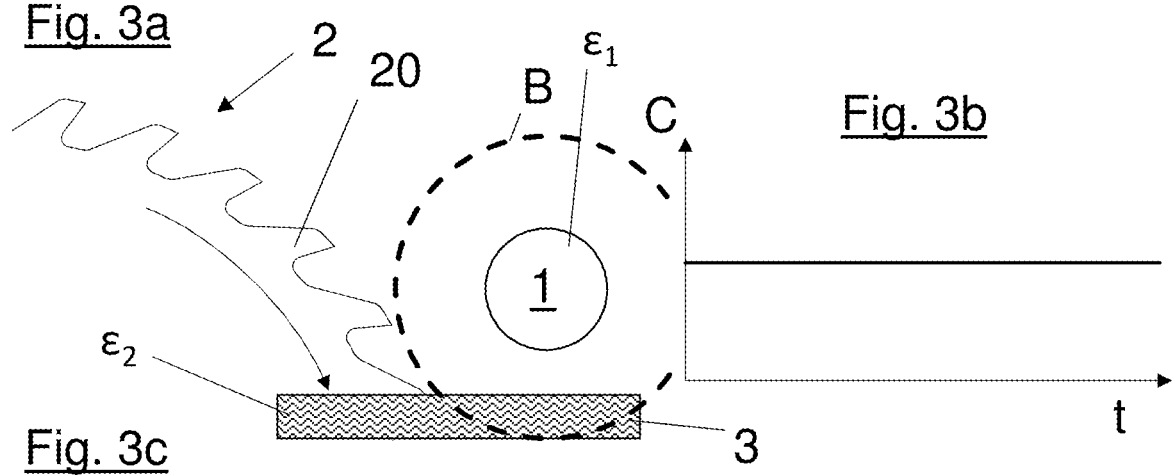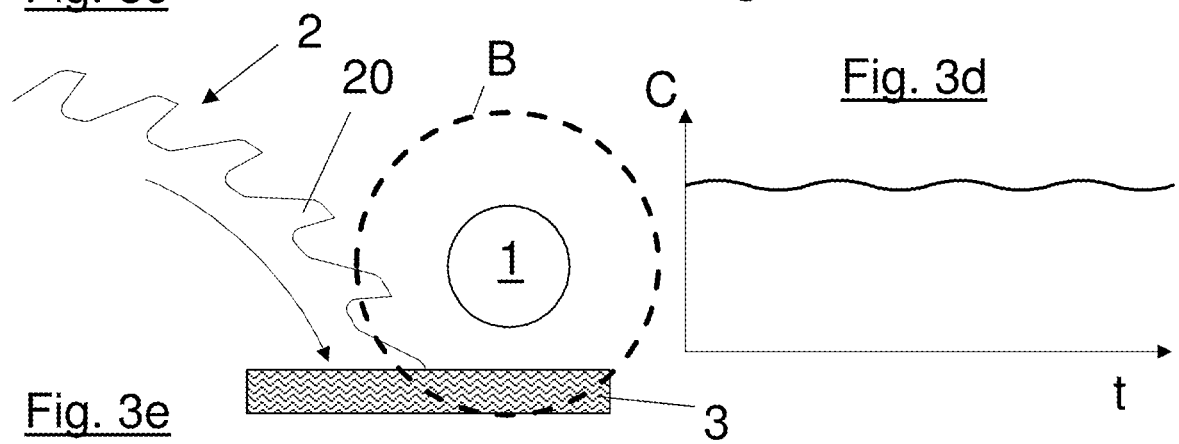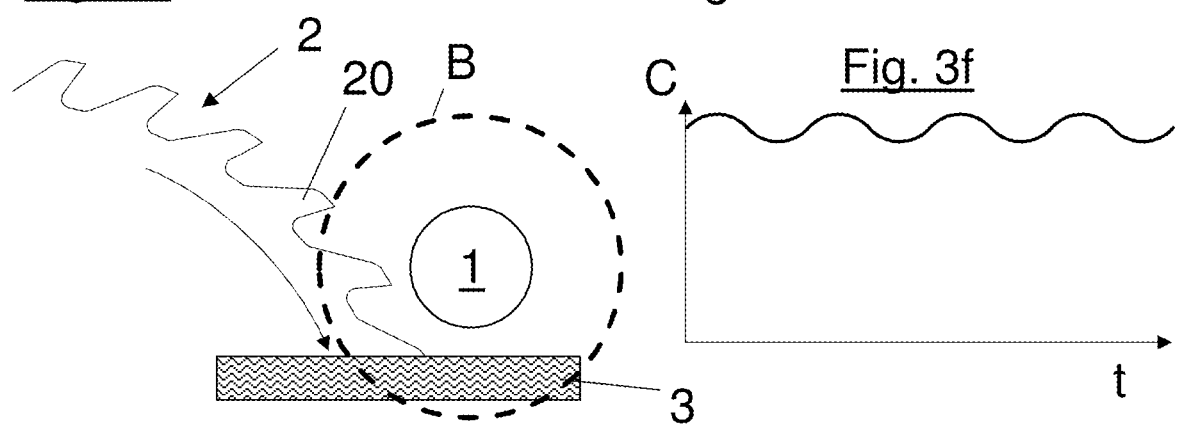

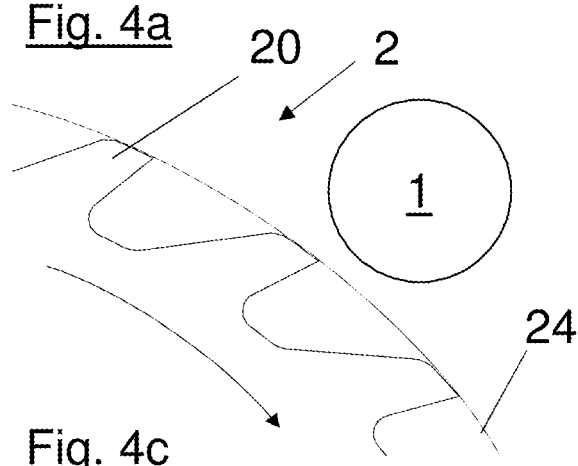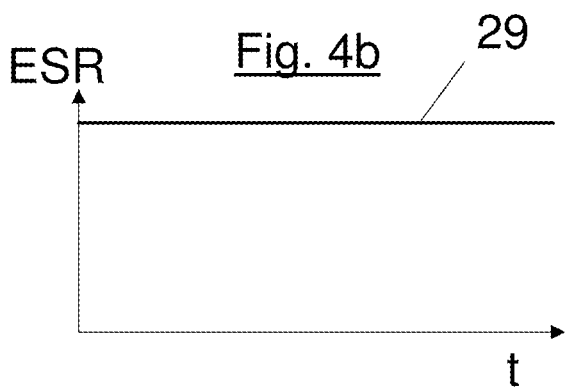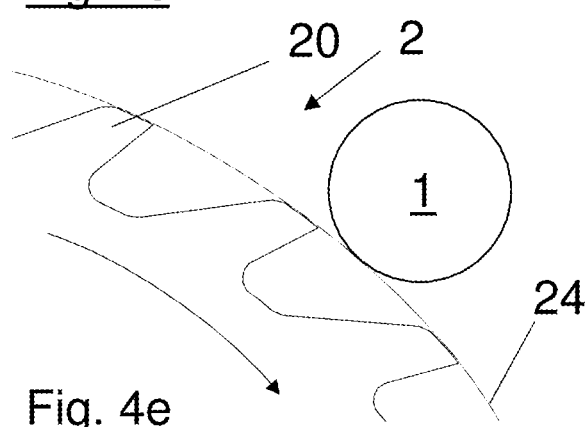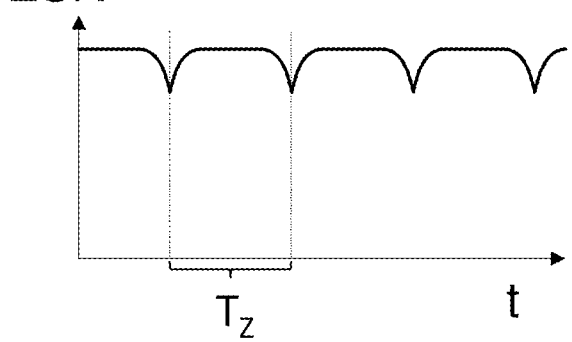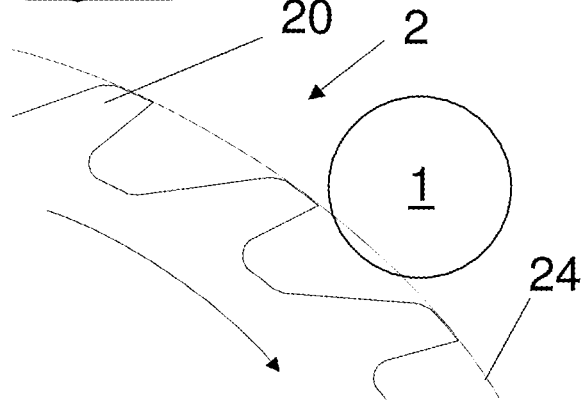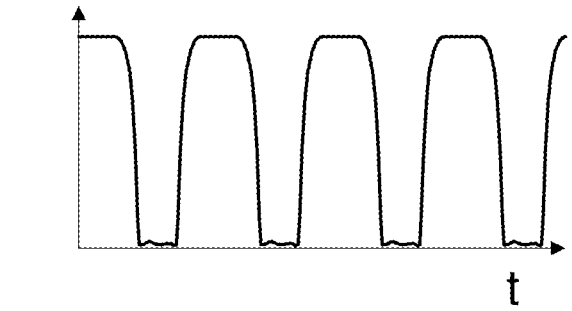

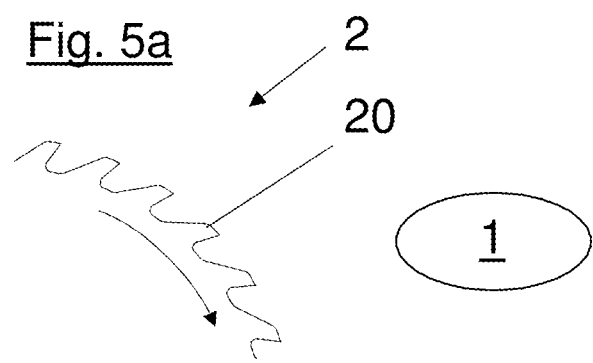
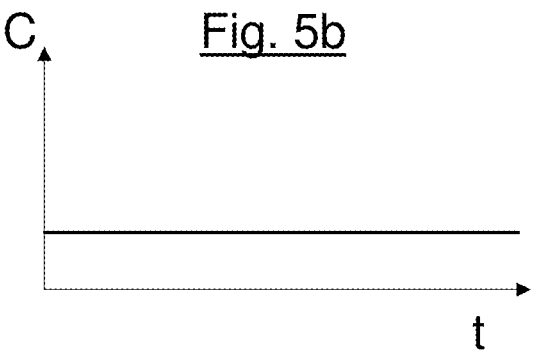
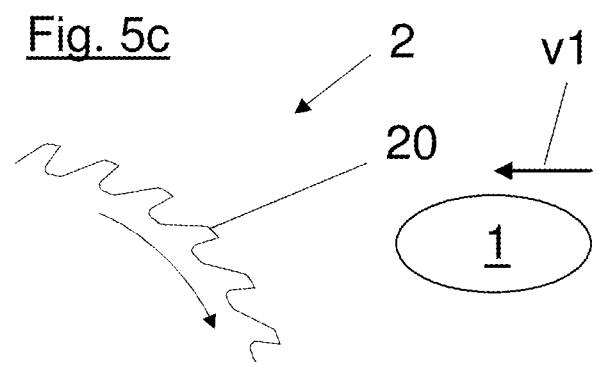
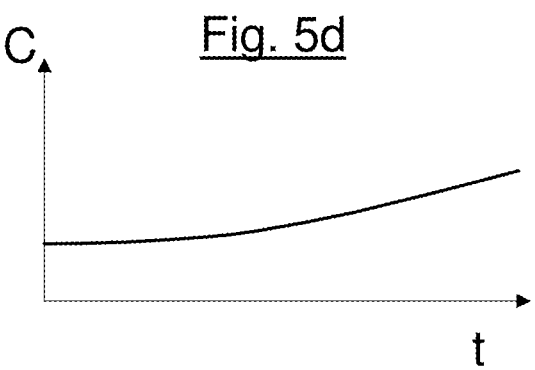
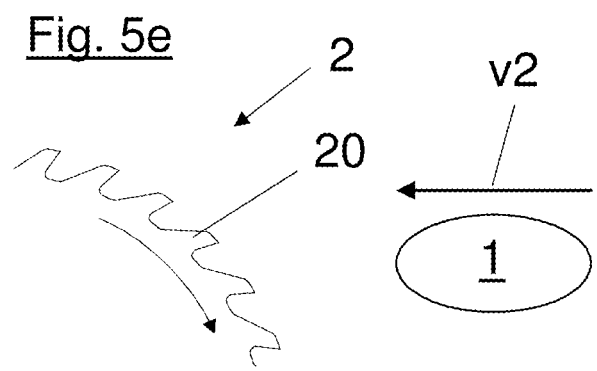
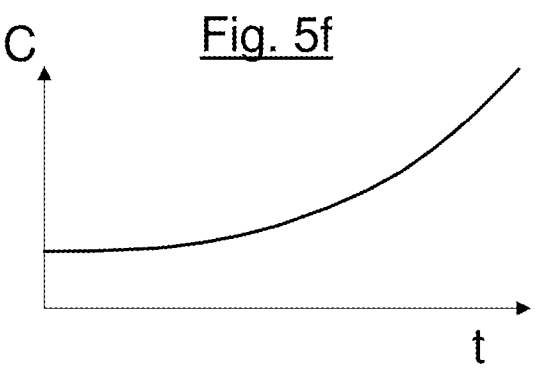

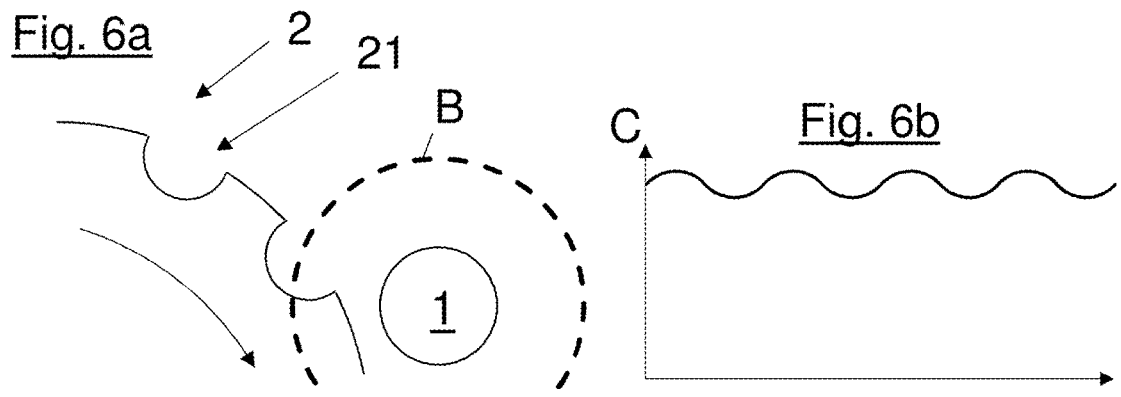
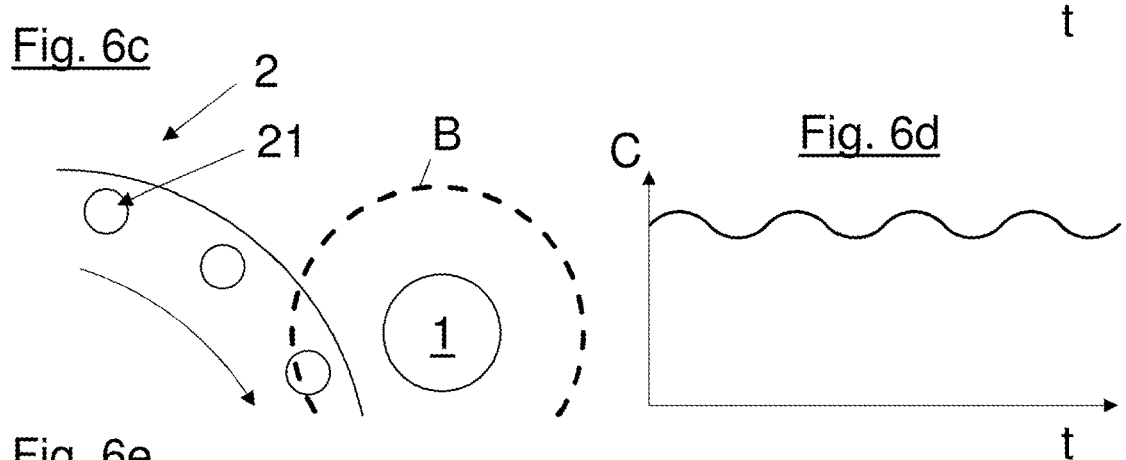
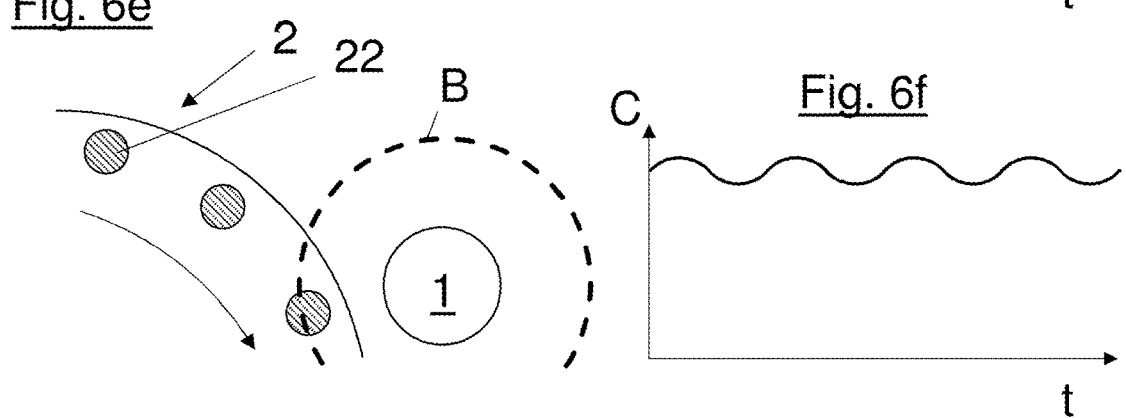
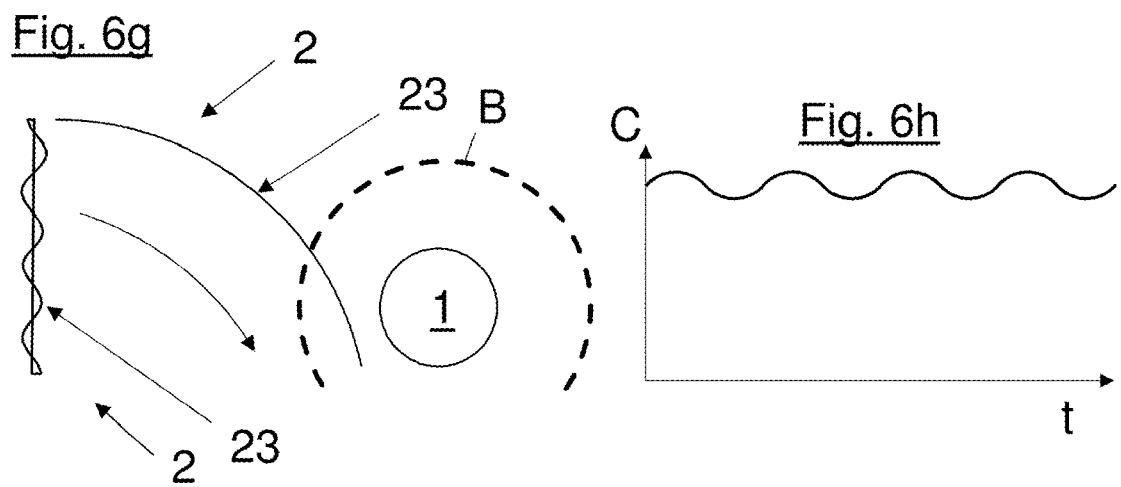

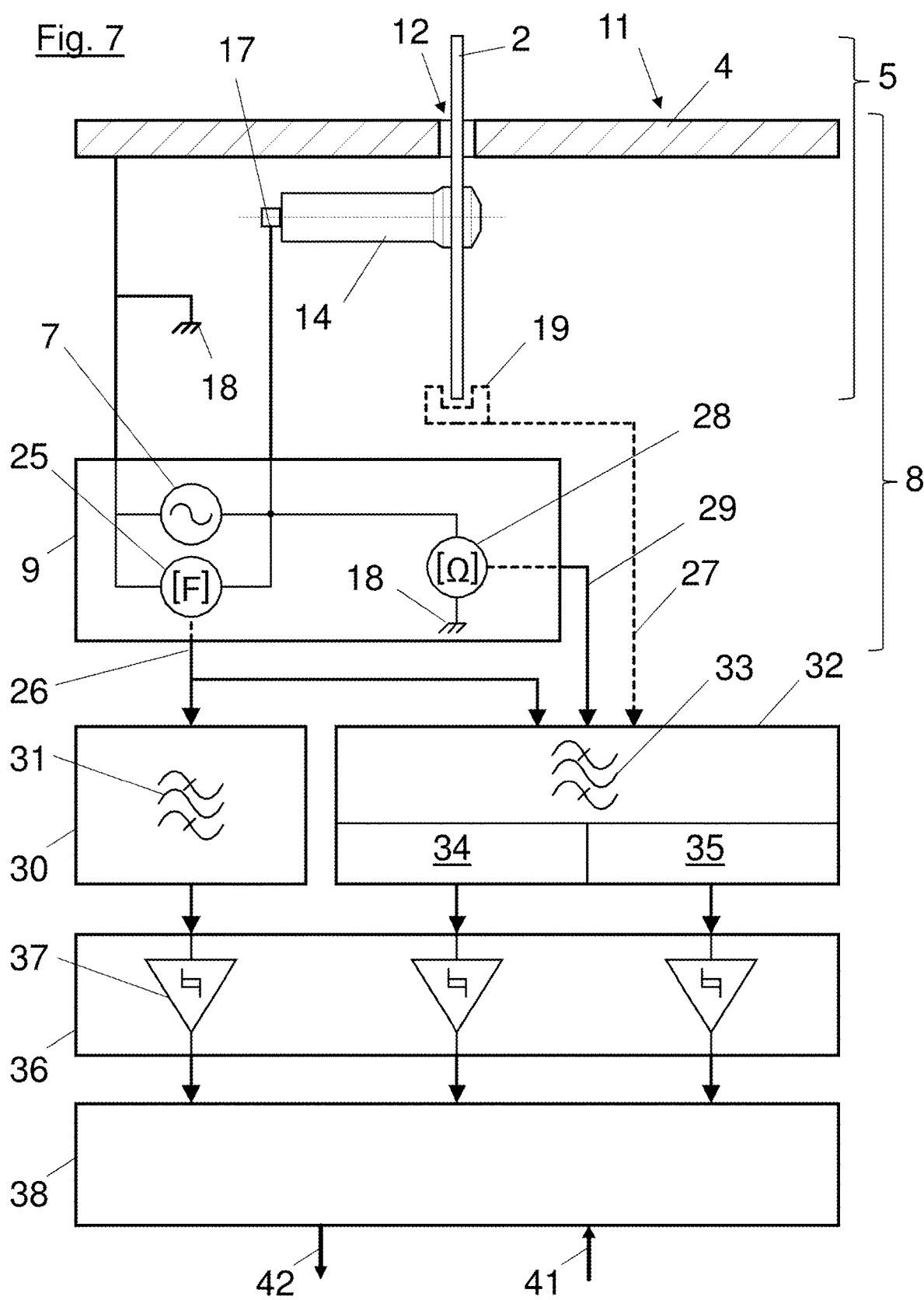

METHOD FOR DETECTING A SUBSTANCE

BACKGROUND OF THE INVENTION

The present invention concerns a method for detecting a substance, preferably human tissue, in the vicinity of a movable tool, having the features described below according to a first aspect of the invention, a detection system for carrying out the method and a machine tool having such a detection system.

Methods of detecting substances in the vicinity of a movable tool are known from the state of the art, like for example from EP 1579146 B1. In the method described therein the approach of a part of a body of a person to a rotating saw blade of a circular saw is recognized by means of the detection of changes of an electromagnetic field in the proximity of the saw blade. In that case the changes in the electric field through a dielectric are detected by means of detuning of an antenna. Differentiating between whether a workpiece or a finger of the person guiding the workpiece comes or will come into contact with the saw blade can be achieved by characterization of the variation in the detuning of the antenna.

In that respect, disadvantages with methods known from the state of the art are the lack of reliability in recognizing a danger situation while at the same time avoiding erroneous identifications (so-called "false positives"), the lack of sensitivity or reliability in terms of differentiating between a workpiece and human tissue, and the lack of reliability or sensitivity in detection of contact with a tool, for example a saw blade, by human tissue. In addition implementations of methods known from the state of the art, being therefore detection systems for carrying out such methods, are usually linked to the use of additional sensors like for example camera systems, lasers or infrared sensors. The structural changes which are necessary as a result on machine tools having such detection systems are correspondingly complicated and expensive.

SUMMARY OF THE INVENTION

The specified object is attained by a method having the features according to a first aspect of the invention, a detection system having the features according to a second aspect of the invention, and a machine tool having such a detection system. Advantageous embodiments of the invention are defined in the appendant claims.

In particular, the invention seeks to provide that the above-mentioned disadvantages in regard to reliability, sensitivity and complexity are overcome.

According to the invention, the object is attained in that a periodic change in the capacitance is detected. The change is caused by the substance being arranged in a region relative to the tool and by a geometrical property of the tool in the region changing periodically in a movement of the tool. The region in that case can extend around the substance to be detected. Thus the region can correspond therefore for example to a spatial region with a radial spacing from the substance to be detected of a plurality of centimeters around the substance. In other words, a periodic change in the capacitance is caused by geometrical conditions which periodically change upon movement of the tool at a point—in particular at the point of the smallest normal distance—between the substance and the tool and that can be detected for detection of the substance in the vicinity of the movable tool. The extent or spread of the region can be related to the sensitivity in detecting the change in capacitance.

The electrode formed by at least a part of the movable tool and the counterpart electrode which is electrically insulated therefrom form a capacitance which can correspond for example to a plate capacitor. The capacitance depends on the electrode surface areas, the spacing of the electrodes and a substance in the electric field between the electrodes (or in an edge region of the electrodes), of given electrical properties, in particular certain dielectric properties. In that case different dielectrics involving different degrees of permittivity (dielectric constants) can influence the capacitance. Thus for example the substance to be detected, for example human tissue in the form of part of the body of a user of the movable tool, can differ from the permittivity of the material to be processed, for example wood, plastic or composite fiber materials. If therefore a change in capacitance is detected it is possible to draw a conclusion about the change in relative permittivity, therefore the presence of a substance. A geometrical property which changes periodically in the region due to a movement of the tool means that now on the one hand—in particular locally in the region of the substance to be detected—the electrode surface provided by at least a part of the tool and/or on the other hand the spacing of the electrode surface formed by at least a part of the tool relative to the counterpart electrode which is electrically insulated in relation thereto can change. That can lead to a periodic change in capacitance. When the substance to be detected is present in a region of the tool in which the periodically changing geometrical property occurs, an increased periodic change in capacitance is produced thereby. In that respect the vicinity can correspond to a direct danger area for the tool, that is to say in particular a near region of several centimeters to millimeters, that is to say a vicinity in which unwanted engagement of the tool into the substance can occur. In general a geometrical property which changes periodically in the region of the substance upon movement of the tool can occur in a peripheral or edge region of the tool—in particular in an operative region of the tool. Now, by virtue of the dielectric properties of the substance to be detected, such a substance which is disposed in an area around the tool can influence the electric field prevailing there (in particular on an emerging edge field), whereby a periodic change in capacitance can be caused.

Such a method is distinguished by a high level of reliability and sensitivity in the detection of substances in a surrounding area, in particular in a near region, of a movable tool. In that respect danger situations like for example accidental contact between a movable tool and a user can be detected and avoided at an early time. Flaws in the material to be processed like for example nails or other foreign bodies in wood materials can also be detected. Such a method is also insensitive in relation to external influences like for example contamination due to dust, as that can admittedly act as a steady component on the capacitance but leaves the periodic component substantially unchanged.

In that respect it can be provided that the tool is a machining tool, preferably a circular saw blade. In that respect machining signifies a mechanical processing method in which material is removed from the material to be processed, by the tool. Examples of machining tools are saw blades, in particular circular saw blades, or saw bands or band saws or also milling tools like end milling cutters or cylindrical milling cutters.

In that respect it can also be provided that the geometrical property which changes periodically in the region upon movement of the tool is given by a cutting geometry of at least one tool cutting edge, in particular by a succession of saw teeth, and/or at least one material recess, and/or at least one material deposit, and/or at least one shaped configuration. In that respect the part of the tool which is operative when processing the material is to be interpreted as the tool cutting edge. As an example here mention may be made of a succession of saw teeth which define a geometrical property of the tool by virtue of their tooth height and the tooth gap existing between individual saw teeth. Upon a movement of a tool of such a design the geometrical property which changes periodically in the region around the substance is given by the presence or absence of the tool cutting edge, that is to say for example a saw tooth, in the region, whereby the electrode surface (due to a change in position) and/or the spacing of the tool relative to the substance in that region periodically changes. If the tool is of a wavy or set-tooth configuration (bending of the tool cutting edges), that can additionally cause a periodic change in the spacing of the electrode formed by the tool. In the case of at least one material recess on the tool, for example a material cut-out or indentation, a periodic change in the electrode surface of the tool can also be achieved when the tool moves. Upon a movement of the tool, a material deposit can for example produce a periodic change in the electrode spacing and the position of the surface of the electrode formed by the tool. If the tool is of a shaped configuration, for example in the case of the tool being of a wavy configuration, a periodic change in the electrode surface and/or the electrode spacing of the electrode formed by the tool can also be achieved when the tool moves.

In principle it can be provided that the movement of the tool is a guided movement, preferably a rotary movement. Guidance for the movement of the tool means that it can be displaced in a forced movement. In that way the tool can be caused to act on the material to be processed, with definite guidance of one in relation to the other. Examples of such movements are for example a rotary movement, a linearly guided movement or a reciprocating movement or reciprocating stroke movement. The guided movement can also take place periodically.

It can also be provided that the counterpart electrode is formed by at least a part of a housing in which the tool is arranged in the assembled position and/or an attachment part. By virtue of the counterpart electrode being formed by a part of the housing in which the tool is arranged in the assembled position, an existing part of the machine tool can be utilized to provide the capacitance, whereby it is also possible to dispense with the use of additional sensors. In that respect an electrically conductive, for example metallic, part of the housing can be suitable as the counterpart electrode. It is however also conceivable that the counterpart electrode can be formed by a suitable attachment component, for example a metal part of a flat configuration, which can be of advantage for example in relation to an electrically non-conductive housing.

It may be advantageous if moreover the periodicity of the geometrical property of the tool, that changes periodically in the region upon movement of the tool, is detected. The periodic change in capacitance can be characterised more easily or better by detection of the periodicity or frequency of the geometrical property of the tool, which changes periodically upon movement of the tool in the region. In that respect the periodicity or frequency can be detected by detecting the period duration. In that case for example it is possible to detect the motor speed of a drive moving the tool. The periodicity or frequency can also be detected for example by inductive pickups or light barrier assemblies.

It may also be advantageous if to detect the change in capacitance the capacitance is used as a frequency-determining element of an electronic oscillator circuit, preferably an LC oscillator circuit. In that respect the term electronic oscillator circuit is used to denote an electronic circuit for generating a periodic AC voltage involving a certain oscillator or oscillation frequency and a certain oscillator or oscillation amplitude of the AC voltage. Because the capacitance is used as a frequency-determining element in the electronic oscillator circuit the capacitance can be characterised by way of the oscillator frequency. When the oscillator circuit is in the form an LC oscillator circuit the capacitance in conjunction with an inductance (fixed inductance) can form a resonance-capable electrical circuit.

In that respect it can be advantageous if a frequency modulation, caused by the periodic change in the capacitance, of the oscillator frequency of the oscillator circuit is detected to detect the substance to be detected. If the capacitance is used as a frequency-determining element of an electronic oscillator circuit, then changes in the capacitance lead to changes in the oscillator frequency, in which respect in particular periodic changes in capacitance lead to periodic changes in the oscillator frequency. Frequency modulation of the oscillator frequency, which occurs in that way, is suitable in particular for detection of the substance to be detected as the occurrence of such modulation is directly linked to the presence of the substance to be detected in the region of the movable tool and can be used for example as an indicator for a danger situation (human tissue in the near region of the moving tool).

In addition it can be advantageous if the frequency modulation is demodulated using the periodicity of the geometrical property of the tool, that changes periodically in the region. As frequency modulation occurs with a modulation frequency substantially corresponding to the periodicity of the geometrical property of the tool, that changes periodically upon movement of the tool in the region, the presence of the substance to be detected can be particularly sensitively and reliably recognized by suitable demodulation. The output signal of such FM demodulation is thus substantially a signal involving a signal frequency corresponding to the periodicity of the geometrical property which changes periodically upon movement of the tool in the region and an amplitude which correlates with the dielectric properties (permittivity) of the substance to be detected and the proximity thereof to the moving tool. The occurrence of such a signal can be used as a reliable indicator for a danger situation.

It can also be advantageous in that respect if moreover an amplitude modulation—caused in particular by contact of the tool by the substance to be detected—of the oscillator amplitude of the oscillator circuit is detected. Direct contact of the tool with the substance to be detected, therefore for example contact of the tool with human tissue, involves damping of the oscillator amplitude, which in the case of a moving tool similarly to frequency modulation also results in amplitude modulation of the oscillator amplitude with substantially the periodicity of the geometrical property that changes periodically upon movement of the tool in the region. Damping or collapse of the oscillator amplitude of the oscillator circuit can thus serve for detecting contact of the tool with the substance to be detected. Detection of a periodic amplitude modulation or damping of the oscillator amplitude of the oscillator circuit can desensitize the method in relation to steady components and can thus increase the tolerance in relation to materials involving certain dielectric properties which occur for example in the case of moist wood or weakly conductive materials.

In that respect, it may also be advantageous if the amplitude modulation is demodulated using the periodicity of the geometrical property of the tool, that changes periodically in the region. Similarly to the above-described FM demodulation it is possible to perform AM demodulation and thus obtain information about contact occurring between the substance to be detected and the tool. The output signal of AM demodulation can in that case be a signal with a signal frequency substantially corresponding to the periodicity of the geometrical property which changes periodically in the region upon movement of the tool and the signal amplitude of which is proportional to the periodic damping of the oscillator amplitude.

It can also be advantageous if moreover a change in the total capacitance of the capacitance is detected for detection of the substance to be detected in the far region of the tool. In the event of the substance to be detected approaching the tool in the far region thereof, for example when approaching the tool from a distance of several decimeters, that can involve a general increase in capacitance and thus a change in the total capacitance of the capacitance. In that way for example it is possible to recognize a rapid approach on the part of the substance to be detected to the tool. In that situation the rate of the change in total capacitance of the capacitance can be detected or a rate of change of an oscillator frequency connected to the capacitance, and also the respective sign of the rate of change, can be detected.

It may further be advantageous if to detect the change in capacitance at least one parameter of the impedance associated with the capacitance, preferably the equivalent series resistance, is detected. By detecting a parameter of the impedance linked to the capacitance it is possible to directly conclude the presence of the substance to be detected. In that case specifically when detecting the equivalent series resistance (ESR) effectively the resistance between the tool and the counterpart electrode which is electrically insulated therefrom can be detected, whereby the resistance signal can be used as a reliable indicator for a danger situation, in particular for recognizing contact between the substance and the tool. In that way for example a slow approach to the tool can be allowed, as subsequent contact can be reliably detected. It is also conceivable to characterize the charging and discharging behaviour of the capacitance and thus to determine for example the momentary value of the AC resistance.

The present invention is also directed to a detection system for carrying out the method as described hereinbefore. The detection system in that respect can have a movable tool and a counterpart electrode electrically insulated from the tool, wherein a capacitance is formed by the tool and the counterpart electrode. The tool can also have a geometrical property which changes periodically upon movement. Furthermore the detection system can include a device for detecting the capacitance formed by the tool and the counterpart electrode. The device can be designed in various ways, for example as described hereinbefore. Such a detection system can permit reliable and sensitive detection of a substance to be detected in a region, in particular in a danger region, of a movable tool. Such a detection system is distinguished by a high level of reliability and uncomplicated sensor means.

Furthermore, the invention is directed to a machine tool having such a detection system. In particular, such a machine tool can be in the form of a sliding table circular saw with for example a sliding table and a saw assembly. Such a machine tool is distinguished by a high level of operating safety and reliability. In addition, only slight structural modifications are necessary to produce such a machine tool so that for example existing machine tools can also be easily retro-fitted or modified.

BRIEF DESCRIPTION OF THE DRAWINGS

Further details and advantages of the present invention are described more fully hereinafter by means of the specific description with reference to the embodiments by way of example illustrated in the drawings in which:

FIGS. 3a through 3f show the course of an approach of a substance to be detected and a material to be processed to a moving tool, FIGS. 4a through 4f show the course of an approach to and contact of a substance to be detected to and with a moving tool, FIGS. 5a through 5f show an approach of a substance to be detected to a moving tool from a far region, FIGS. 6a through 6h show various configurations of a moving tool, FIG. 7 is a block circuit diagram of a detection system.

DETAILED DESCRIPTION OF PREFERRED EMBODIMENTS

Figure 1:
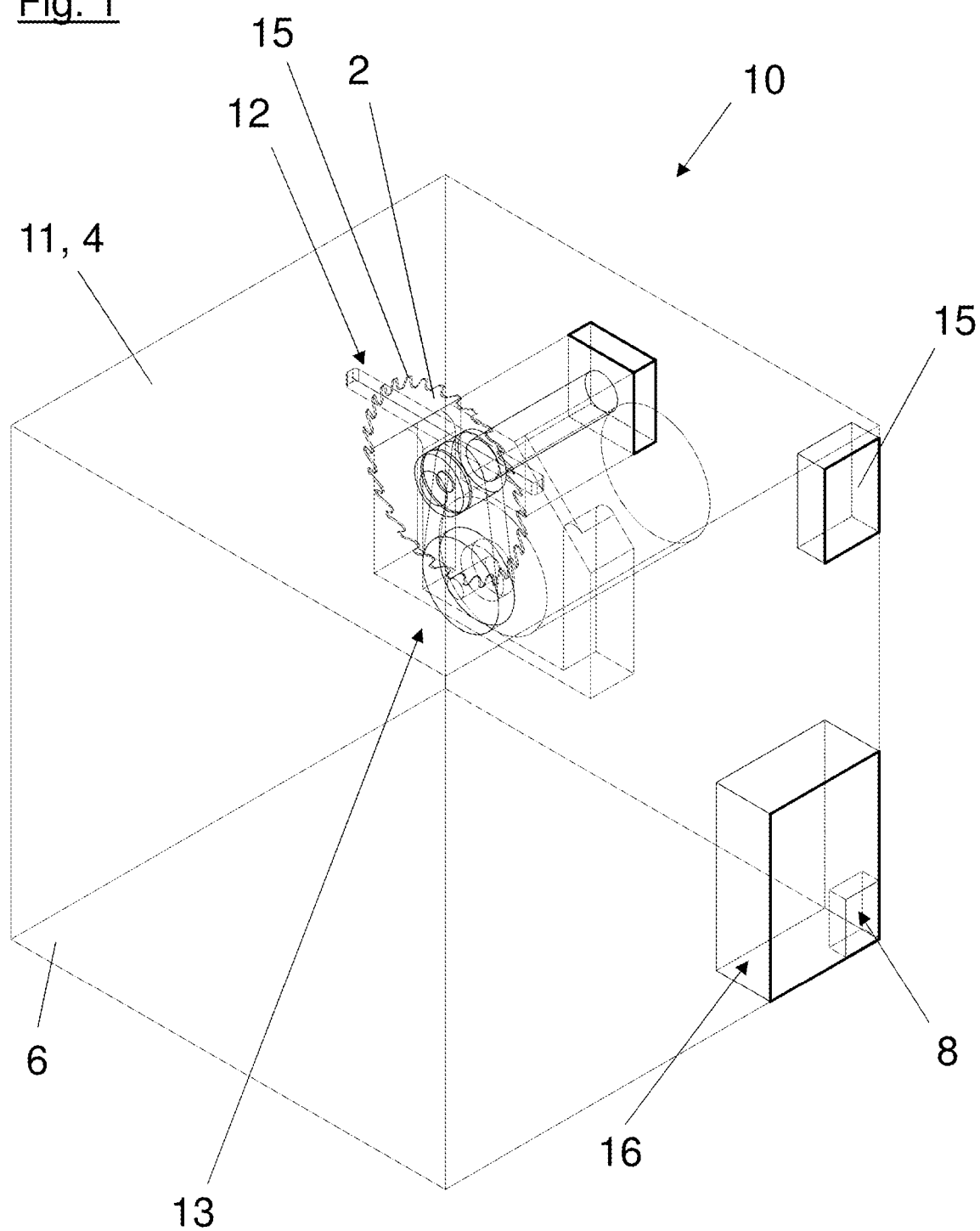
FIG. 1 is a perspective view of a diagrammatic illustration of a machine tool.

FIG. 1 shows a greatly simplified diagrammatic view of a machine tool 10 in the form of a table circular saw having a housing 6, a saw table 11 and a tool 2 in the form of a circular saw blade. In this arrangement the tool 2 is arranged in an opening 12 in the saw table 11 and projects partially therefrom. The tool 2 can be moved or driven by a drive 13 arranged in the inside region of the housing 6. The drive 13 can for example have an electric motor and a drive belt. The machine tool 10 further has operating elements 15 which can include an on/off switch, means for selecting operating modes and status indications. In the diagrammatically illustrated embodiment of the machine tool 10 a detection system 8 for carrying out a detection method according to the invention is arranged in a control box 16. In operation of the machine tool 10 the moving tool 2, therefore for example a rotating circular saw blade, can constitute a danger region for a user which arises due to the moving saw teeth 20 of the tool 10 in the form of a circular saw blade.

Figure 2A:
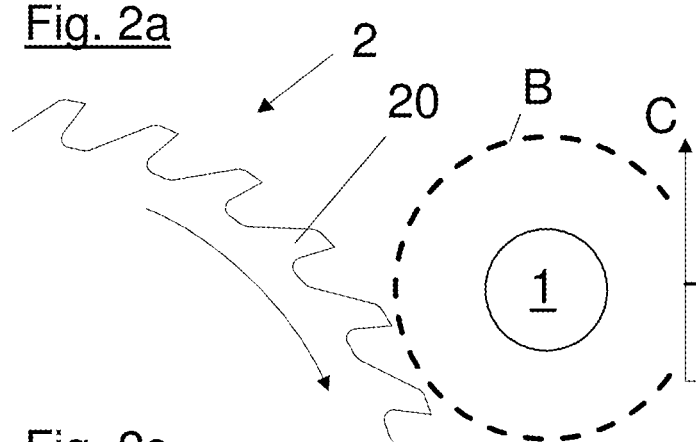
FIGS. 2a through 2f show the course of an approach of a substance to be detected to a moving tool.

Such a danger situation is illustrated in FIGS. 2a through 2f. FIG. 2a shows a tool 2 in the form of a circular saw blade, with saw teeth 20 formed thereon. The movement of the tool, here a rotary movement, is stylistically illustrated by a curved arrow. In that case a capacitance 5 is formed by the tool 2 and a counterpart electrode 4 (not shown here). A substance 1 to be detected, for example a finger of a user, is disposed in the vicinity of the saw teeth 20, more precisely in a far region. The term far region is used here to denote a spacing of the substance 1 to be detected from the tool 2 of some decimeters. The region B illustrated in circular form is shown around the substance 1. In this case the region B extends around the substance 1 over a certain spatial region. Thus as shown the region B corresponds to the region around the substance 1, within which, with the tool 2 moving, a change in the capacitance 5, caused by geometric properties of the moving tool 2 that change periodically in the region B, can be detected. The extent of the region B can be related to the sensitivity in detection of the change in capacitance 5.

Figure 2B:
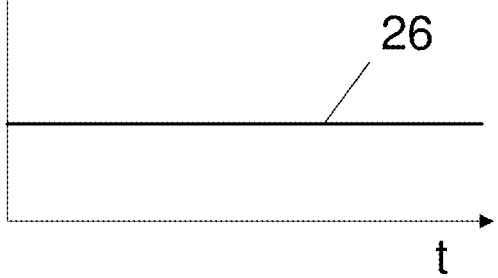

The geometrical property of the moving tool 2, that changes periodically in the region B, is shown in FIGS. 2*a* through 2*f* by the saw teeth 20 which are of a certain surface area and are of a configuration projecting from the periphery of the tool 2. FIG. 2*b* shows the progression over time of a capacitance signal 26 of the capacitance 5 formed by the tool 2 and the counterpart electrode 4 (not shown here, see for example FIG. 10). In that case time is plotted on the abscissa identified by t and the value C of the capacitance 5 is plotted on the ordinate identified by C. It can be seen from FIG. 2*b* in that respect that, with the positioning shown in FIG. 2*a* of the substance to be detected in a far region relative to the moving tool 2, still no substantial change in capacitance is caused as here within the region B there is no geometrical property of the moving tool 2, that changes periodically with movement.

Figure 2C:
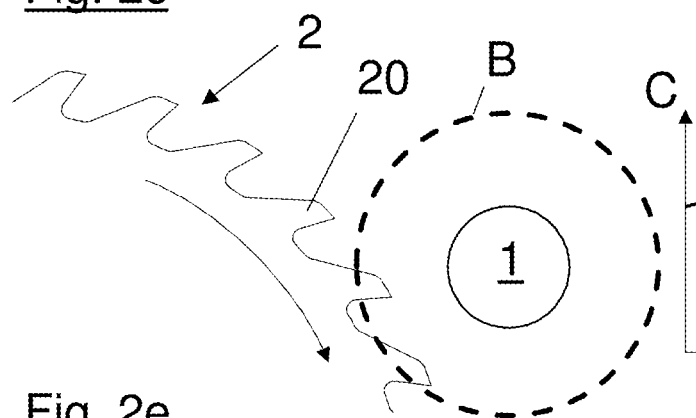
Figure 2D:
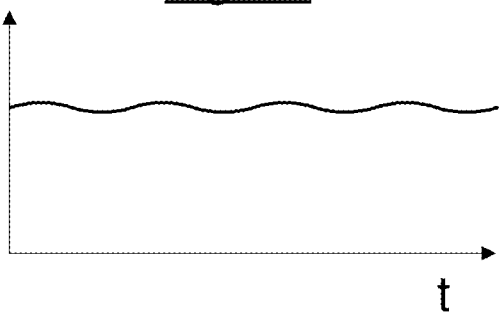

In FIG. 2*c* the substance to be detected in contrast thereto is already in an area around the moving tool 2 with the saw teeth 20 which are formed thereon, in which a periodic change in the capacitance 5 is caused. Parts of the saw teeth 20 are disposed in the region B around the substance 1 to be detected, for example a finger of a user. The region B can here include a region around the substance to be detected, of some centimeters or millimeters from the tool 2. When a substance 1 is present and a tool 2 is moving, saw teeth 20 are periodically moved past the substance 1 and the electric field of the capacitance 5, emanating from the saw teeth 20, is influenced by the dielectric properties of the substance 1 in such a way that there is a periodic change in the capacitance. That is illustrated by a wavy, here substantially sinusoidal, configuration of the value C. It can also be seen from FIG. 2*d* that the total value of the value C of the capacitance 5 has increased overall by the substance 1 to be detected approaching the tool 2. That therefore corresponds in substance to a steady component of the value C of the capacitance 5. The change in the capacitance 5, occurring due to the geometrical property of the tool 2, that changes periodically in the region B, substantially corresponds to an alternating component.

Figure 2E:
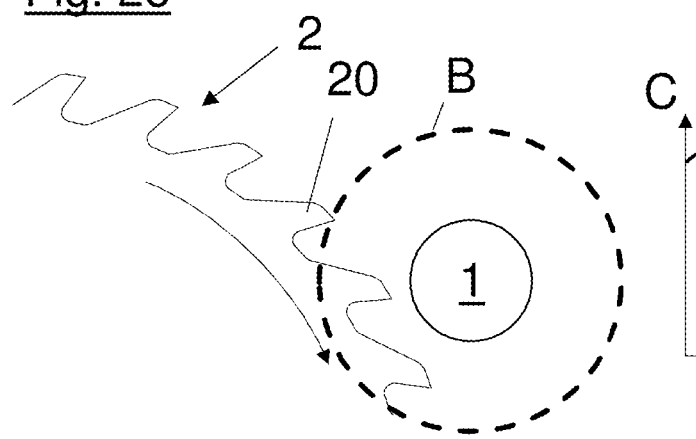
Figure 2F:
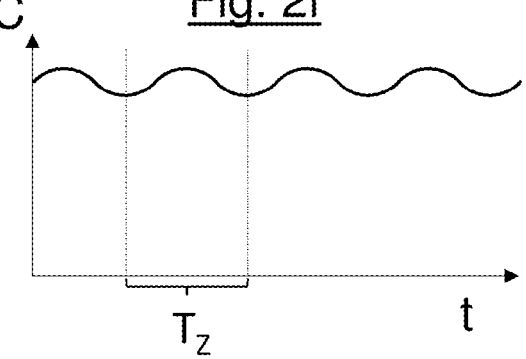

FIG. 2*e* shows a substance 1 which has directly approached the tool 2, wherein by virtue of the movement of the tool 2 the tool cutting edges which are provided on same in the form of saw teeth 20 (or also the intermediate spaces between the tool cutting edges) are moved past the substance 1 within the region B. Because of that, as described above, a periodic change in the capacitance 5 is caused by the position of the electrode surface of the tool 2 changing periodically locally (that is to say in relation to the region B), as is also illustrated in FIG. 2*f*. In that respect it can also be seen from FIG. 2*f* that the further approach of the substance 1 to the tool 1 has caused a change (increase) in the overall capacitance of the capacitance 5. The periodically changing component of the capacitance 5 is of a period duration $T_z$, which is inversely proportional to the periodicity $f_z$. The period duration $T_z$ substantially corresponds to the period of time required between the movement of a saw tooth 20 past the substance 1 and the movement of a following saw tooth past the substance 1. By virtue of the direct approach, for example to a spacing of a few millimeters, of the substance 1 to the saw teeth 20 of the tool 2, the periodic change in capacitance 5 caused thereby is particularly greatly pronounced.

FIGS. 3*a* through 3*f* show a situation similar to FIGS. 2*a* through 2*f*, but here in addition to the substance 1 a work material 3 to be processed by the tool 2 is also shown. The substance 1 and the material 3 to be processed can have different electrical properties, in particular different dielectric properties. In this case the substance 1 involves a first permittivity $\varepsilon_1$ and the material 3 involves a second permittivity $\varepsilon_2$. With different permittivities $\varepsilon_1$, $\varepsilon_2$ therefore in principle the substance 1 and the tool 2 exert influences of different magnitude on electric fields. Those influences of differing strength on electric fields can be utilized for distinguishing a substance 1 from a material 3 in an area around the tool 2.

FIG. 3*a* shows a work material 3 which is in engagement with the tool 2 and a substance 1 disposed at a certain spacing from the tool 2. Here too the region B around the substance 1 is illustrated. In comparison of the value C shown in FIG. 3*b* with the configuration shown in FIG. 2*b*, it can be seen that the total capacitance of the capacitance 5 is admittedly overall increased by the presence of the material 3, but with sufficiently large differences in the dielectric properties of the material 3 and the substance 1 to be detected, there is not a large periodic change in the capacitance 5. It is assumed in that respect that dielectric properties, therefore the permittivities $\varepsilon_1$, $\varepsilon_2$, of the material 3 and the substance 1 to be detected differ significantly. Thus for example the relative permittivities of human tissue and wood differ by about a factor of 20, which also has a corresponding effect on the magnitude of the change in capacitance. Upon closer examination, an approach of a material 3 involving a low permittivity $\varepsilon_2$ will also cause a periodic change in the capacitance 5, but in practice that can be ignored in comparison to the periodic change in the capacitance 5 that is caused by a substance 1 to be detected involving a high permittivity $\varepsilon 1$.

FIG. 3*c* shows the material 3 being processed and the substance 1 to be detected after a further approach to the moving tool 2. Parts of the tool 2 penetrate into the region B. In that respect it can be seen from the FIG. 3*d* progression of the value of the capacitance 5 that the total capacitance of the capacitance 5 was increased overall by the approach of the substance 1 and the material 3, and now also involves a periodically variable component caused by the proximity of the substance 1.

As shown in FIGS. 3*e* and 3*f* that effect is pronounced to a greater degree upon a still further approach movement of the substance 1 to be detected to the moving tool 2. Larger parts of the tool 2 project into the region B. In that case the movement of the part of the tool 2 that has penetrated into the work material 3 and the penetrated saw teeth 20 contributes substantially only to the total value (steady component) of the capacitance 5 as the saw teeth 20 which have engaged in the material 3 relative to the material 3 do not cause any change in surface and/or spacing of the electrode provided by the tool 2.

FIGS. 4*a* through 4*f* show a configuration of an approach and contacting of a substance 1 to and with a moving tool 2 with saw teeth 20 formed thereon. The peripheral line 24 described by the saw teeth which are moved with the tool 2 represent in that case the boundary from which contact with the tool 2 can effectively occur and substantially corresponds to the envelope curve generated upon movement of the tool 2. Shown in parallel therewith in the graphs is the progression over time of an impedance signal 29 of a parameter of the impedance associated with the capacitance 5, here specifically the equivalent series resistance identified by ESR.

FIG. 4a shows a situation in which the substance 1 to be detected has approached the moving tool 2 without contacting same (or the envelope curve). The progression over time of the value of the equivalent series resistance, shown in FIG. 4b, is thus substantially uninfluenced by the presence of the substance 1 and is thus constant.

FIG. 4c shows a situation in which the substance 1 to be detected has approached the moving tool 2 in such a way that the saw teeth 20 thereon contact the substance 1 on moving past same, but do not engage into same to any degree worth mentioning. It can be seen from the progression over time of the equivalent series resistance shown in FIG. 4d that when the tool 2 comes into contact with the substance 1, it is markedly periodically changed by same. Thus detection of a parameter of the impedance associated with the capacitance 5, in particular when detecting the equivalent series resistance of the capacitance 5, can be effected reliably and contact of the tool 2 with the substance 1 to be detected can be recognized with a high degree of sensitivity.

FIG. 4e shows an approach of the substance 1 to the moving tool 2, in which the saw teeth 20 on the tool 2 can already be markedly in engagement with the substance 1. Such contacting or engagement can be clearly seen in that respect in FIG. 4f from the progression over time of the equivalent series resistance of the capacitance 5. The change in the equivalent series resistance of the capacitance 5, caused by the substance 1 coming into contact with the tool 2, can be governed on the one hand by a capacitive coupling of the substance 1 to the counterpart electrode 4 of the capacitance 5, that exists even without contact occurring (series connection of the capacitances) or also by a possibly provided electrically conductive connection of the tool 2 forming an electrode of the capacitance 5 with the substance 1 referenced at a given electrical potential (for example ground potential).

FIGS. 5a through 5f show an approach of the substance 1 to a moving tool 2 at different approach speeds v1, v2 from the far region. In that respect FIG. 5a firstly shows a stationary substance 1 to be detected, for example a hand of a user, at some spacing, for example some decimeters, from the moving tool 2. The progression over time of the value C of the capacitance 5, shown in FIG. 5b, is constant in that case by virtue of the constant spacing.

FIG. 5c shows an approach of the substance 1 to the moving 2 at a first approach speed v1. FIG. 5d shows the rise in respect of time of the value of the capacitance 5, caused thereby. In that respect the gradient in the capacitance value is proportional to the approach speed.

Similarly thereto FIG. 5e shows the approach of a substance 1 to a moving tool 2 at a second higher approach speed v2. The progression over time of the value of the capacitance 5, shown in FIG. 5f, is correspondingly steeper in gradient. The faster an approach movement is, the correspondingly greater is the gradient of the changing value. Thus, in addition to the presence of a substance 1 in a near region of the tool 2, an approach of a substance 1 to be detected to the tool 2 in a far region can also be recognized.

FIGS. 6a through 6h show various configurations of moving tools 2 with geometrical properties changing upon movement. Thus FIG. 6a shows an embodiment of the tool 2 with material recesses 21, giving the geometrical property which changes periodically in the region B upon movement of the tool. Such a configuration of the tool 2 can be suitable for example for segmented grinding discs. As shown in FIG. 6b, in the case of a tool 2 of this configuration, a periodic change in the capacitance 5 is also caused when a substance 1 to be detected is present. FIG. 6c shows an embodiment of the tool 2 with material recesses 21, for example holes. As FIG. 6d shows, in the case of a tool 2 of such a design configuration, a periodic change in the capacitance 5 is caused when a substance 1 to be detected is present. Such a configuration can also be suitable for example for peripheral grinding discs or also for saw blades with very fine teeth. FIG. 6e shows a configuration of a tool 1 which material application portions or deposits 22, for example projecting axially from the tool 2, or bores in the tool 2 that are filled with a given material. As shown in FIG. 6f, in the case of a tool 2 of such a configuration, a periodic change in the capacitance 5 is also caused when a substance 1 to be detected is present. FIG. 6g shows a configuration of a tool 2 with geometrical properties which are afforded by shaped configurations 23 of the tool 2 and which change periodically when the tool 2 moves. Shown here are a plan view and a side view, illustrated as in the other Figures, of the tool 2. Thus for example a peripheral region of the tool 2 can be of a wavy nature. As shown in FIG. 6h in the case of a tool 2 of such a design configuration a periodic change in the capacitance can also be caused when a substance to be detected is present.

In general it can be said that a capacitance 5 with a radially and azimuthally (or polar) inhomogenous electric field can be formed by the tool 2 and the counterpart electrode 4 which is insulated therefrom. In that respect the configuration of the field or the inhomogeneities of the field can correspond to the shape configuration (and possibly periodicity) of the tool geometry. When the tool 2 moves, the inhomogenous electric field can also be transported with the tool 2 and when a substance 1 is present in the area around or in the electric field of the tool 2 a change in the capacitance corresponding to the inhomogeneities of the field (such change possibly being periodic) can be caused and detected.

FIG. 7 shows a block circuit diagram of an embodiment of a detection system 8 for carrying out a method for detecting a substance 1. The detection system 8 here includes a capacitance 5 formed by a tool 2 constituting a first electrode and a saw table 11 constituting a counterpart electrode 4, and a device 9 for detecting the capacitance 5. The saw table 11 is grounded by way of the ground connection 18 and thus electrically connected to ground potential. The tool 2 mounted to the saw shaft 14 of a drive 13 (not shown here) projects partially out of an opening 12 in the saw table 11. To detect the capacitance by means of the device 9, the tool 2 is contacted by way of a contacting means 17, for example a sliding contact, on the saw shaft 14. The device 9 for detecting the capacitance in the illustrated embodiment comprises an oscillator circuit 7, a capacitance detection device 25 and an impedance detection device 28. The capacitance 5 can be used in the oscillator circuit 7 as a frequency-determining element. A capacitance signal 26 can be output by the capacitance detection device 25, relating to the characterization of the operating parameters of the oscillator circuit 7 like for example oscillator amplitude or oscillator frequency. As an alternative thereto the capacitance 5 can be determined by the capacitance detection device 25 by means of other measurement methods, for example by way of characterization of a charging or discharging current of the capacitance 5. At least one parameter of the impedance associated with the capacitance 5, for example the equivalent series resistance, can be detected by the impedance detection device 28 connected in this embodiment to a ground connection 18 and thus referenced at ground potential, and an impedance signal 29 can be output. For further processing of the signals output by the device 9 for detecting the capacitance 5, the arrangement can also have a frequency detection device 19 which outputs a frequency signal 27.

The devices shown in FIG. 7 in addition to the detection system 8 serve for further processing of the signals output by the device 9 for detecting the capacitance 5. In that respect firstly an approach of a substance 1 to a moving tool 2, as shown by way of example in FIGS. 5a through 5f, can be recognized by the approach detection device 30. In that case an upper and a lower limit frequency can be established for the capacitance signal 26 by a band pass filter 31. The output signal of the approach detection device 30 can correspond to the approach speed v1, v2. The further approach detection device 32 serves to detect an approach of a substance 1 to the movable tool 2 in a near region of the tool 2, as shown by way of example in FIGS. 2a through 2f and 3a through 3f. In that respect, for evaluation purposes, it is possible to use the frequency signal 27 which characterizes the periodicity $f_z$ of the geometrical properties of the tool 2 that change periodically upon movement of the tool.

Here too a band pass filter 33 can be used. The incoming signals can pass through a capacitance evaluation means 34 or a resistance evaluation means 35, in which case the output signals characterize an approach or contact of the substance 1 to be detected to or with the tool 2. A threshold value detection device 36 having threshold value detectors 37 can provide for defining signal levels from which a switching signal is delivered at the output of the threshold value detection device 36. With those threshold values it is possible to establish danger thresholds whereby for example a maximum permissible approach speed v1, v2 or a maximum permissible approach of the substance 1 to be detected to the tool 2 can be established. Finally the signals output by the threshold value detection device 36 can be evaluated by an evaluation logic means 38 in dependence on the operating state of the machine tool 10, which can be characterized by input signals 41. Desired protective measures can also be initiated by the evaluation logic means 38 by suitable setting of output signals 42.

Figure 8:
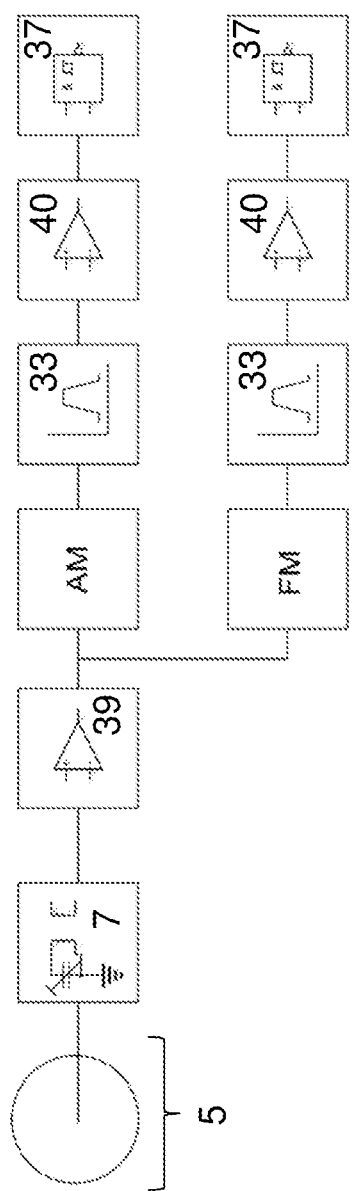
FIG. 8 is a block circuit diagram of a detection system.
Figure 9C:
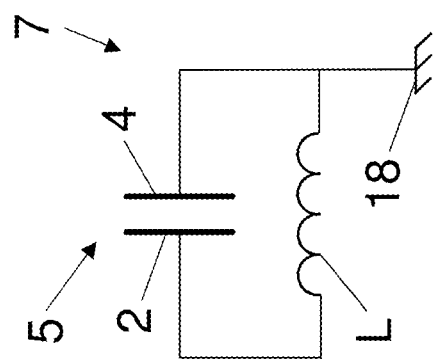
FIGS. 9a through 9c are detail views of parts of a detection system.
Figure 9B:
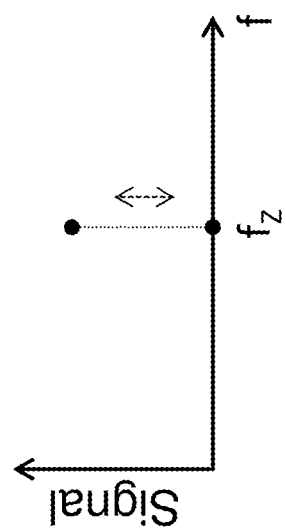

FIG. 8 shows a block circuit diagram of an analog-design variant of a part of the detection system 8. Unlike the arrangement shown, however, a variant which is implemented in part or entirely using digital technology is also conceivable. The illustrated variant includes a capacitance 5, an oscillator circuit 7 operated therewith and two parallel demodulation branches for characterization of the capacitance 5. In this case as illustrated in FIG. 9c the capacitance 5 is formed by a tool 2 and a counterpart electrode 4. In this case the counterpart electrode 4 can be connected to ground potential by way of a ground connection 18. To characterize the capacitance 5 same in the configuration shown in FIG. 8 forms a frequency-determining part of an oscillator circuit 7, which besides the capacitance 5 has an inductance L. That inductance can be formed for example in the form of a primary winding of a transmitter or transformer. For characterization of the capacitance 5 an AM-demodulator AM follows a high frequency amplifier 39 on the output side and parallel thereto there is an FM-demodulator FM. A change in capacitance 5 as described hereinbefore involves a change in the oscillator frequency or oscillator amplitude, which can be detected by the demodulation branches. That is illustrated in FIGS. 9a and 9b.

Figure 9A:
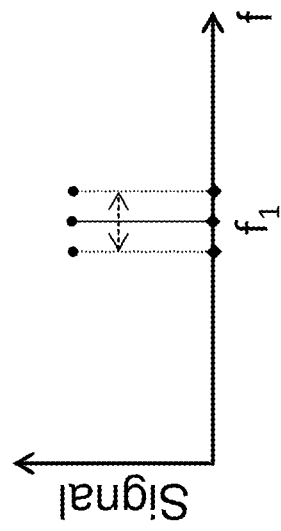

FIG. 9a shows the case of a frequency modulation occurring in respect of the oscillator frequency of the oscillator circuit 7 in a frequency representation. In this case (as also in FIG. 9b) the abscissa indicated with f represents the frequency axis and the ordinate denoted by Signal represents the amplitude of the oscillator circuit 7. With an undisturbed capacitance 5, that is to say in the absence of a substance 1 to be detected, there is firstly a first oscillator frequency $f_1$ with a given amplitude. In the frequency representation in FIG. 9a that corresponds to a signal at $f_1$. If now the capacitance 5 is changed periodically by the presence of a substance 1 to be detected—as is shown for example in FIGS. 2a through 2f and FIGS. 3a through 3f—that would entail a periodic increase and decrease in the oscillator frequency. In the frequency representation in FIG. 9a therefore the signal will fluctuate periodically between a higher and a lower frequency. That frequency modulation takes place with the periodicity $f_z$ of the geometrical property of the tool 2 that changes periodically upon movement of the tool 2. FM-demodulation supplies an AC voltage signal, the occurrence and amplitude of which are in direct correlation with the presence and the proximity of the substance 1 to be detected in a region of the tool 2. In the case of a (monotonic) approach of a substance 1 to be detected to the tool 2 from a far region the signal would move (monotonically) in a direction along the frequency axis, which could also be detected by FM-demodulation in the form of a (monotonically) changing signal. An AC voltage signal of the periodicity $f_z$ can advantageously be used as the reference frequency for demodulation. By means of a band pass filter 33 which is transmissive at the periodicity $f_z$ it is possible to specifically watch out for the occurrence of a signal caused by the periodic change in the capacitance 5. That can afford a high degree of stability for the detection method in relation to disturbances and steady components. An AC amplifier 40 can then supply the filtered output signal to a threshold value detector 37.

When the tool 2 is contacted by the substance 1, that can firstly entail damping of the oscillator amplitude. If engagement continues, that can involve periodic contacting of the substance 1 with the tool 2. Similarly to FM-demodulation it is now also possible to carry out AM-demodulation of the modulated output signal of the oscillator circuit 7. Thus an AC voltage signal can be obtained from amplitude modulation of the oscillator amplitude, the occurrence and amplitude of that signal being directly related to contacting of the substance 1 to be detected with the tool 2. FIG. 9b shows the situation of amplitude modulation of the oscillator amplitude, occurring at the periodicity $f_z$. As amplitude modulation occurs only upon periodic contacting of the substance 1 with the tool 2 and thus with the periodicity $f_z$ of the geometrical property of the tool 2 that changes periodically upon movement of the tool 2, it is possible with a band pass filter 33 to watch for the occurrence of the demodulated signal involving the periodicity $f_z$. In that way detection of contact between the tool 2 and the substance 1 can be effected reliably and with a high level of sensitivity. Here too an AC amplifier 40 can deliver the filtered output signal to a threshold value detector 37.

LIST OF REFERENCES

Substance 1
Material 3
Counterpart electrode 4
Capacitance 5
Housing 6
Oscillator circuit 7
Detection system 8
Device 9
Machine tool 10

Saw table 11
Opening 12
Drive 13
Saw shaft 14
Operating elements 15
Control box 16
Contacting 17
Ground connection 18
Frequency detection device 19
Saw tooth 20
Material opening 21
Material deposit 22
Shape configuration 23
Peripheral line 24
Capacitance detection device 25
Capacitance signal 26
Frequency signal 27
Impedance detection device 28
Impedance signal 29
Approach detection device 30
Band pass filter 31
Approach detection device 32
Band pass filter 33
Capacitance evaluation 34
Resistance evaluation 35
Threshold value detection device 36
Threshold value detector 37
Evaluation logic means 38
High frequency amplifier 39
ac voltage amplifier 40
Input signals 41
Output signals 42
Region B
Period duration $T_z$
Periodicity $f_z$
Approach speed v1
Approach speed v2
AM-demodulator AM
FM-demodulator FM
Inductance L
Capacitance value C
First frequency $f_1$

The invention claimed is:

1. A method for detecting a substance in the vicinity of a movable tool, wherein the substance to be detected differs in its electrical properties from a material which is processed by the movable tool, the method comprising detecting a change in a capacitance formed by the tool and a counterpart electrode that is electrically insulated from the tool, wherein the detecting of the change includes detecting a periodic change in the capacitance,
wherein the periodic change is caused by the substance being arranged in a region relative to the tool, and by a geometrical property of the tool within the region changing periodically upon a movement of the tool.

2. The method as set forth in claim 1, wherein the tool is a machining tool.

3. The method as set forth in claim 2, wherein the machining tool is a circular saw blade.

4. The method as set forth in claim 1, wherein the geometrical property which changes periodically within the region upon movement of the tool is given by:
a cutting geometry of at least one tool cutting edge, and/or
at least one material recess, and/or
at least one material deposit, and/or
at least one shaped configuration.

5. The method as set forth in claim 4, wherein the at least one tool cutting edge is a succession of saw teeth.

6. The method as set forth in claim 1, wherein the movement of the tool is a guided movement.

7. The method as set forth in claim 6, wherein the guided movement is a rotary movement.

8. The method as set forth in claim 1, wherein the counterpart electrode is formed by at least a part of a housing in which the tool is arranged in an assembled position and/or an attachment part.

9. The method as set forth in claim 1, wherein the periodicity of the geometrical property of the tool, that changes periodically within the region upon movement of the tool, is detected.

10. The method as set forth in claim 1, wherein to detect the change in capacitance, the capacitance is used as a frequency-determining element of an electronic oscillator circuit.

11. The method as set forth in claim 10, wherein a frequency modulation, caused by the periodic change in the capacitance, of the oscillator frequency of the oscillator circuit is detected to detect the substance to be detected.

12. The method as set forth in claim 10, wherein a frequency modulation, caused by the periodic change in the capacitance, of the oscillator frequency of the oscillator circuit is detected to detect the substance to be detected, and the frequency modulation is demodulated using the periodicity of the geometrical property of the tool, that changes periodically within the region.

13. The method as set forth in claim 10, wherein amplitude modulation of the oscillator amplitude of the oscillator circuit is detected.

14. The method as set forth in claim 13, wherein the amplitude modulation is caused by contact of the tool by the substance to be detected.

15. The method as set forth in claim 10, wherein amplitude modulation of the oscillator amplitude of the oscillator circuit is detected, and the amplitude modulation is demodulated using the periodicity of the geometrical property of the tool, that changes periodically within the region.

16. The method as set forth in claim 10, wherein the electronic oscillator circuit is an LC oscillator circuit.

17. The method as set forth in claim 1, wherein a change in the total capacitance of the capacitance is detected for detection of the substance to be detected in the far region of the tool.

18. The method as set forth in claim 1, wherein to detect the change in capacitance at least one parameter of the impedance associated with the capacitance is detected.

19. The method as set forth in claim 18, wherein the at least one parameter of the impedance associated with the capacitance is the equivalent series resistance.

20. The method as set forth in claim 1, wherein the substance is human tissue.

21. A detection system including:
a movable tool configured for processing a material;
a counterpart electrode electrically insulated from the movable tool; and
a device for detecting a change in a capacitance formed by the movable tool and the counterpart electrode,
wherein the detection system is configured for detecting a substance in the vicinity of the movable tool, the substance differing in its electrical properties from the material processed by the movable tool, wherein the movable tool has a geometrical property which, upon movement of the movable tool, changes periodically within a region relative to the movable tool, and wherein the detecting of the change includes detecting a periodic change in the capacitance, the periodic change being caused by the substance being arranged in the region relative to the movable tool, and by the geometrical property of the movable tool within the region changing periodically upon movement of the movable tool.

22. A machine tool comprising:
a housing; and
the detection system as set forth in claim 21, the detection system being arranged within the housing.

23. The machine tool as set forth in claim 22, wherein the machine tool is a sliding table saw.

\* \* \* \* \*